United States Patent [19]

Pryor et al.

[11] Patent Number: 5,734,172
[45] Date of Patent: *Mar. 31, 1998

[54] METHOD AND APPARATUS FOR ELECTRO OPTICALLY DETERMINING THE DIMENSION, LOCATION AND ATTITUDE OF OBJECTS

[75] Inventors: Timothy R. Pryor; Bernard Hockley; Nick Liptay-Wagner; Omer L. Hageniers; W. J. Pastorius, all of Windsor, Canada

[73] Assignee: Sensor Adaptive Machines Inc., Windsor, Canada

[*] Notice: The term of this patent shall not extend beyond the expiration date of Pat. No. 5,362,970.

[21] Appl. No.: 465,649

[22] Filed: Jun. 5, 1995

Related U.S. Application Data

[62] Division of Ser. No. 334,350, Nov. 2, 1994, Pat. No. 5,510,625, which is a division of Ser. No. 124,605, Sep. 21, 1993, Pat. No. 5,362,970, which is a division of Ser. No. 836,508, Feb. 18, 1992, Pat. No. 5,280,179, which is a division of Ser. No. 711,397, Jun. 6, 1991, Pat. No. 5,164,579, which is a continuation of Ser. No. 511,967, Apr. 17, 1990, abandoned, which is a continuation of Ser. No. 381,031, Jul. 19, 1989, abandoned, which is a continuation of Ser. No. 262,131, Oct. 25, 1988, abandoned, which is a continuation of Ser. No. 59,632, Jun. 8, 1987, abandoned, which is a continuation of Ser. No. 757,208, Jul. 22, 1985, Pat. No. 4,674,869, which is a continuation of Ser. No. 697,683, Feb. 1, 1985, abandoned, which is a continuation of Ser. No. 634,191, Jul. 27, 1994, abandoned, which is a continuation of Ser. No. 378,808, May 17, 1982, abandoned, which is a division of Ser. No. 34,278, Apr. 30, 1979, Pat. No. 4,373,804.

[51] Int. Cl.⁶ .................................................. G01C 3/08
[52] U.S. Cl. .................... 250/559.23; 350/559.31; 350/559.33
[58] Field of Search .................. 250/559.19, 559.22, 250/559.23, 559.29, 559.31, 559.33, 559.38, 559.4, 559.44; 356/376, 377

[56] References Cited

U.S. PATENT DOCUMENTS

| | | | |
|---|---|---|---|
| 3,227,886 | 1/1966 | Dunigan et al. | 250/566 |
| 3,513,320 | 5/1970 | Weldon | 250/566 |
| 3,520,607 | 7/1970 | Zoot | 356/376 |
| 3,679,307 | 7/1972 | Zoot et al. | 356/4 |
| 3,723,003 | 3/1973 | Vockenhuber | 356/4 |
| 3,796,492 | 3/1974 | Cullen et al. | 356/1 |
| 3,854,035 | 12/1974 | Tyler | 250/566 |
| 3,875,870 | 4/1975 | Cullen et al. | 356/437 |
| 3,888,362 | 6/1975 | Fletcher et al. | 701/47 |
| 3,899,250 | 8/1975 | Bamburg et al. | 356/5 |
| 3,947,119 | 3/1976 | Bamburg et al. | 356/5 |
| 3,986,774 | 10/1976 | Lowrey et al. | 356/5 |
| 3,994,583 | 11/1976 | Hutchins | 356/28 |
| 4,004,852 | 1/1977 | Pentecost | 356/1 |
| 4,040,738 | 8/1977 | Wagner | 356/1 |
| 4,047,025 | 9/1977 | Lemelson | 701/47 |
| 4,073,247 | 2/1978 | Cunningham et al. | |
| 4,146,327 | 3/1979 | Harris | 356/1 |
| 4,149,089 | 4/1979 | Idelsohn et al. | |
| 4,168,437 | 9/1979 | Nihonmatsu | 356/4 |
| 4,171,917 | 10/1979 | Pirlet | |
| 4,183,672 | 1/1980 | Raber et al. | 356/4 |
| 4,187,051 | 2/1980 | Kirsch et al. | 414/744 |
| 4,248,432 | 2/1981 | Nosler | 356/1 |

(List continued on next page.)

FOREIGN PATENT DOCUMENTS

| | | |
|---|---|---|
| 0728860 | 4/1966 | Canada . |
| 1536022 | 12/1978 | United Kingdom . |
| 7900189 | 4/1979 | WIPO . |

Primary Examiner—Edward P. Westin
Assistant Examiner—John R. Lee
Attorney, Agent, or Firm—Larson & Taylor

[57] ABSTRACT

A method and apparatus for optically determining the dimension of part surfaces. Particular embodiments describe optical triangulation based coordinate measurement machines capable of accurate measurement of complex surfaces, such as gear teeth and turbine blades. Other embodiments provide highly useful sensors for robot guidance and related purposes. Up to 5 axis sensing capability is provided on surfaces of widely varying form.

40 Claims, 14 Drawing Sheets

U.S. PATENT DOCUMENTS

| | | | |
|---|---|---|---|
| 4,248,532 | 2/1981 | Nosler | 356/1 |
| 4,259,492 | 3/1981 | Frugel et al. | 356/5 |
| 4,259,592 | 3/1981 | Frungel et al. | 356/5 |
| 4,281,342 | 7/1981 | Ueda et al. | 701/47 |
| 4,297,725 | 10/1981 | Shimizu et al. | 250/206.1 |
| 4,305,661 | 12/1981 | Pryor et al. | 356/241 |
| 4,373,804 | 2/1983 | Pryor et al. | 356/1 |
| 4,613,942 | 9/1986 | Chen | 250/557 |
| 4,674,869 | 6/1987 | Pryor et al. | 356/1 |
| 5,164,579 | 11/1992 | Pryor et al. | 250/206.1 |
| 5,280,179 | 1/1994 | Pryor et al. | 250/561 |
| 5,362,970 | 11/1994 | Pryor et al. | 250/561 |

FIG. 3A(1)
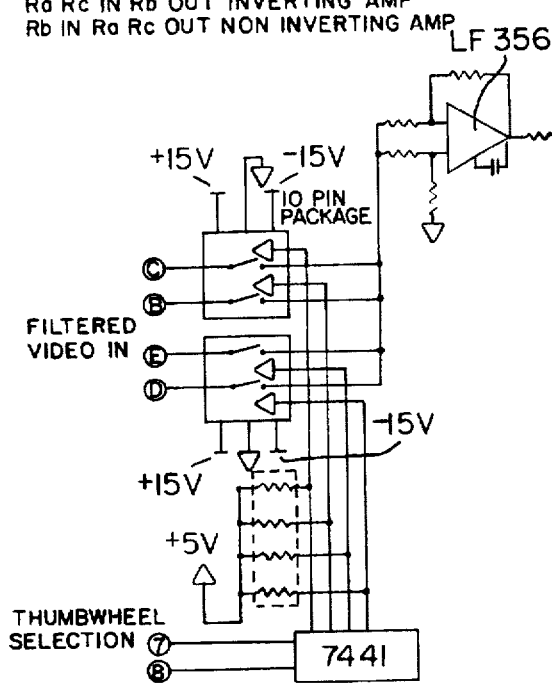
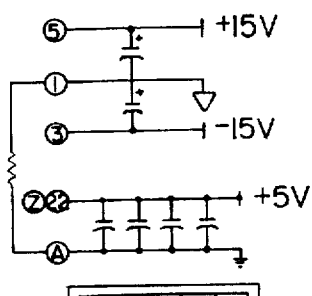
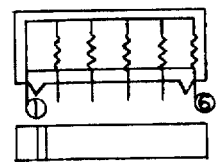
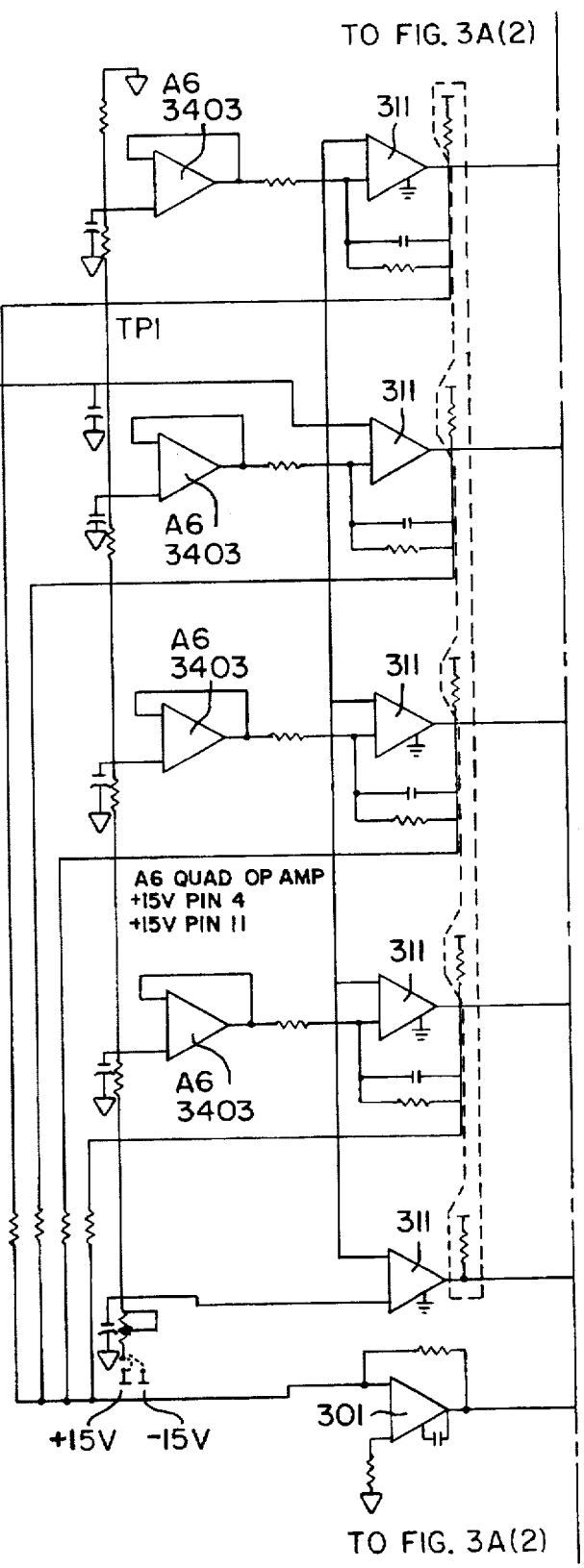

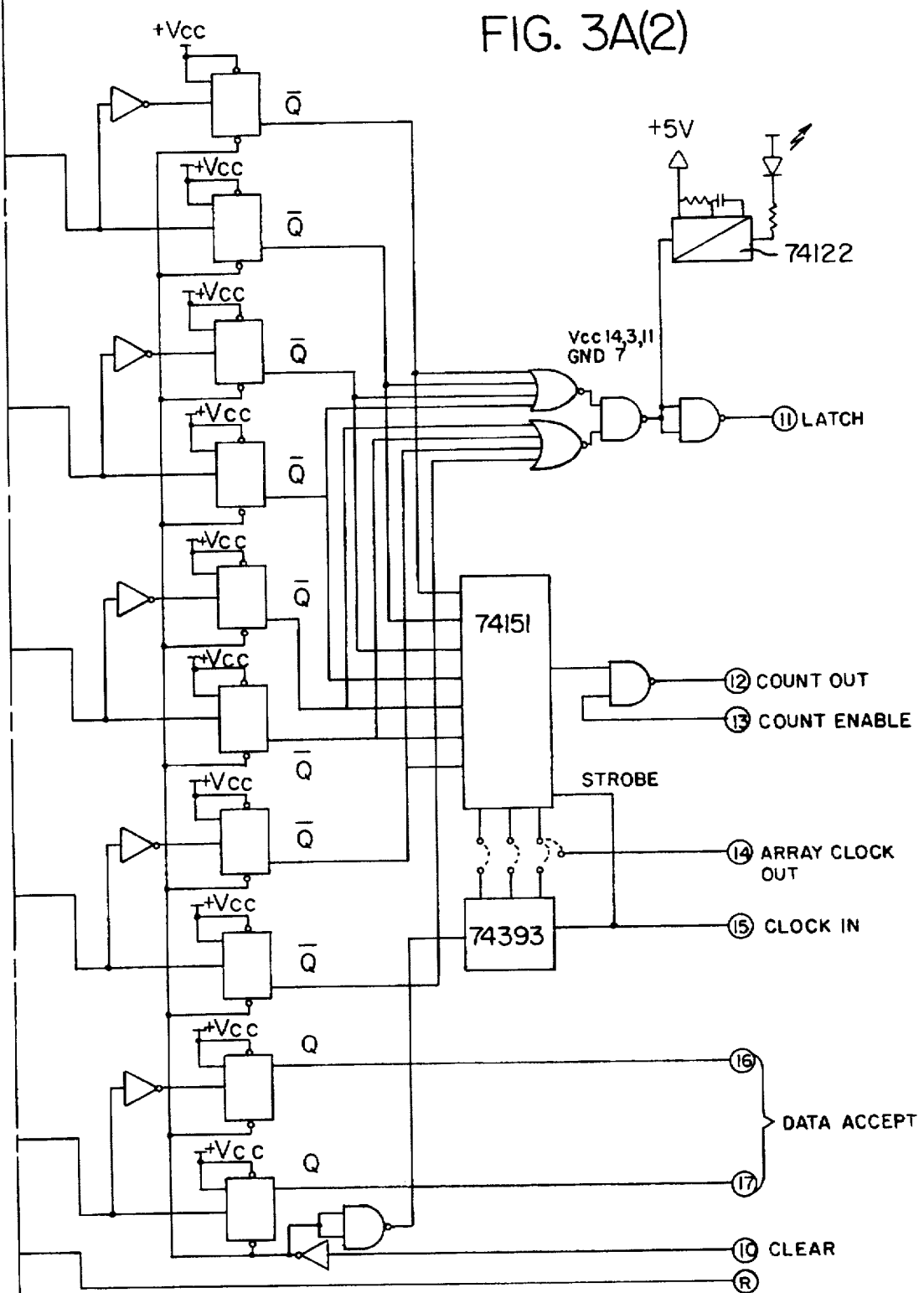
FIG. 3A(2)

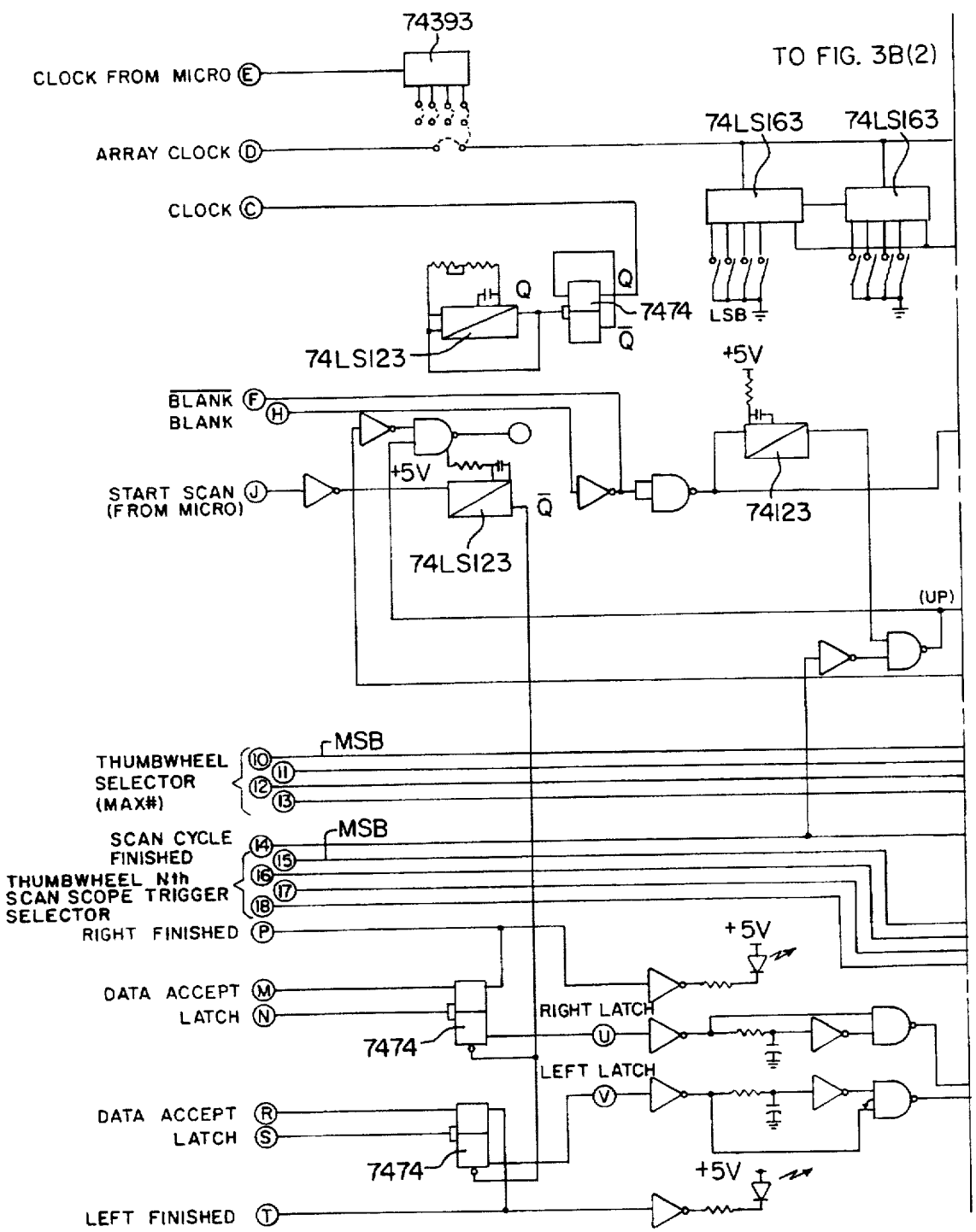
FIG. 3B(1)

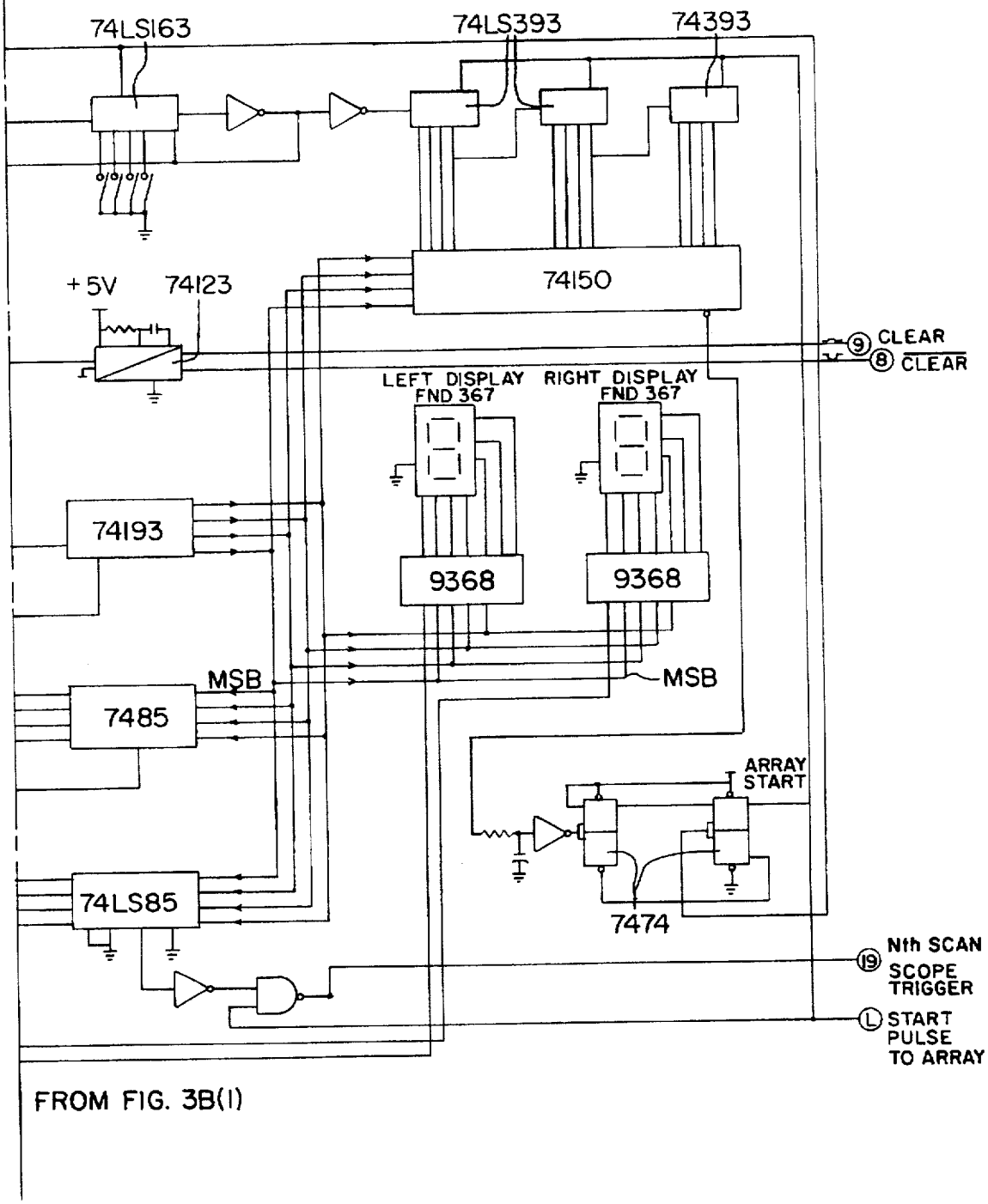
FIG. 3B(2)

MULTI-SENSOR MEASURING TECHNIQUE

PUMP VANE MEASUREMENT

SENSOR AS IN FIG. 1 BUT USING TWO SPOTS TO PROVIDE ANGLE DEFINITION

DIRECTION OF LINES OF BARS GIVE ORIENTATION REFERENCE 5,734,172

1

METHOD AND APPARATUS FOR ELECTRO OPTICALLY DETERMINING THE DIMENSION, LOCATION AND ATTITUDE OF OBJECTS

This application is a division of application Ser. No. 08/334,350, filed Nov. 2, 1994, now U.S. Pat. No. 5,510,625 which is a division of application Ser. No. 08/124,605, filed Sep. 21, 1993, now U.S. Pat. No. 5,362,970, which was a division of application Ser. No. 07/836,508, filed Feb. 18, 1992, now U.S. Pat. No. 5,280,179, which was a division of application Ser. No. 07/711,397, filed Jun. 6, 1991, now U.S. Pat. No. 5,164,579 which was a continuation of application Ser. No. 07/511,967, filed Apr. 17, 1990, now abandoned, which was a continuation of application Ser. No. 07/381,031, filed Jul. 19, 1989, now abandoned, which was a continuation of application Ser. No. 07/262,131, filed Oct. 25, 1988, now abandoned, which was a continuation of application Ser. No. 07/059,632, filed Jun. 8, 1987, now abandoned, which was a continuation of application Ser. No. 06/757,208, filed Jul. 22, 1985, now U.S. Pat. No. 4,674,869, which was a continuation of application Ser. No. 06/697,683, filed Feb. 1, 1985, now abandoned, which was a continuation of application Ser. No. 06/634,191, filed Jul. 27, 1984, now abandoned, which was a continuation of application Ser. No. 06/378,808, filed May 17, 1982, now abandoned, which was a division of application Ser. No. 06/034,278, filed Apr. 30, 1979, now U.S. Pat. No. 4,373,804.

FIELD OF THE INVENTION

This invention discloses method and apparatus for optically determining the dimension, location and attitude of part surfaces. Particular embodiments describe optical triangulation based co-ordinate measurement machines capable of accurate measurement of complex surfaces, such as gear teeth and turbine blades.

The invention also discloses means for accurately sensing in up to 5 axes the xy location, range and attitude in two planes of an object or object feature, as well as the measurement of angular and size variables on the object.

There are many triangulation sensors in the present art, but none is known to have achieved what this one discloses, namely 0.0001" or even 50 millionths of an inch accuracy on complex surfaces, in a manner capable of high speed analysis of surface form.

To be truly accurate on surfaces of widely varying form, the sensor must have an ability to operate with huge (e.g. $10^4$) variations in returned light intensity from the part, without giving an apparent change in dimension. And too, the sensor must provide high resolution, drift free digital readout of part dimension. These and other features are present in the invention.

DETAILED DESCRIPTION OF THE INVENTION

FIGS. 3A and 3B are electrical schematic diagrams of printed circuits useful in the embodiment of FIG. 3;

2

Figure 5:
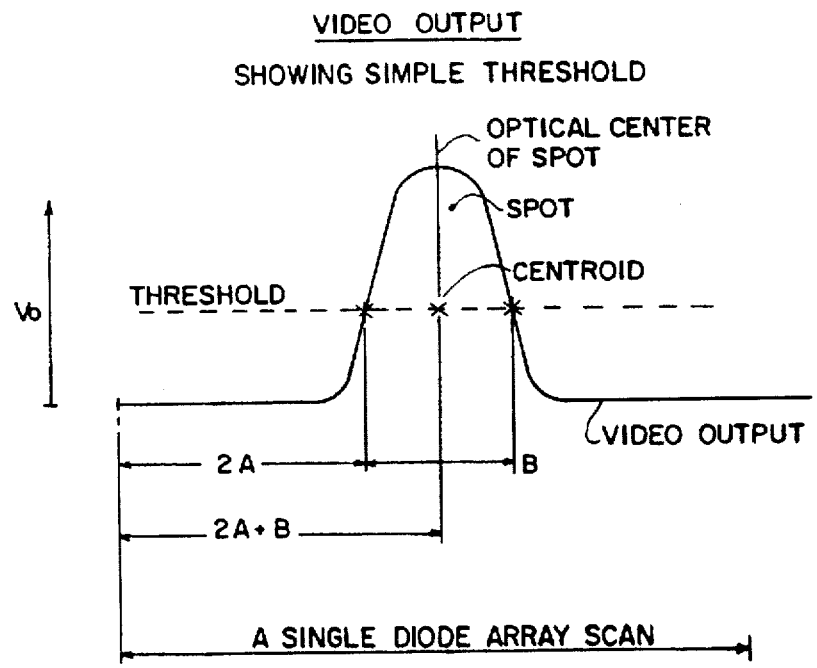
Figure 6:
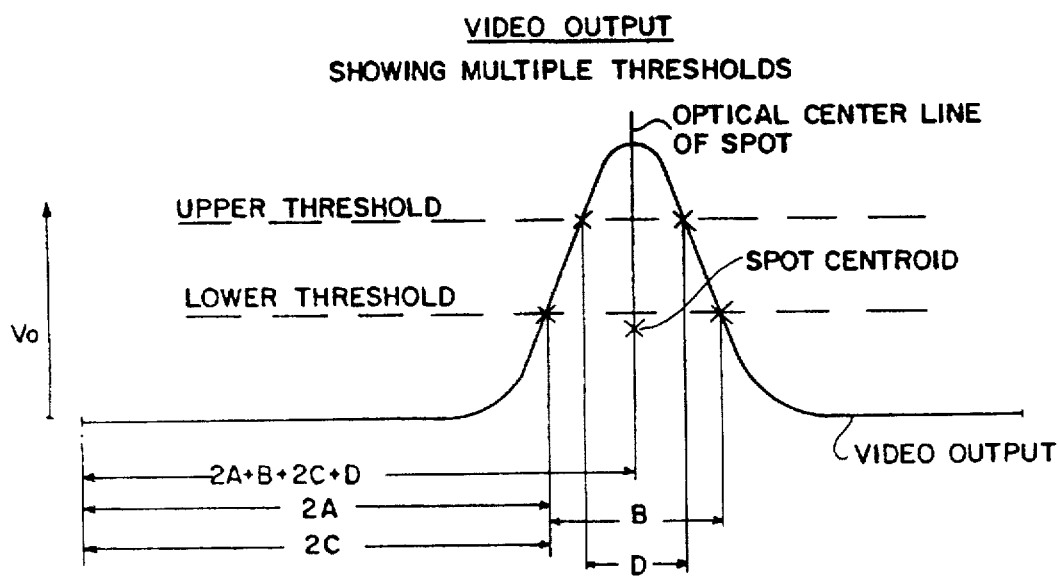
Figure 7:
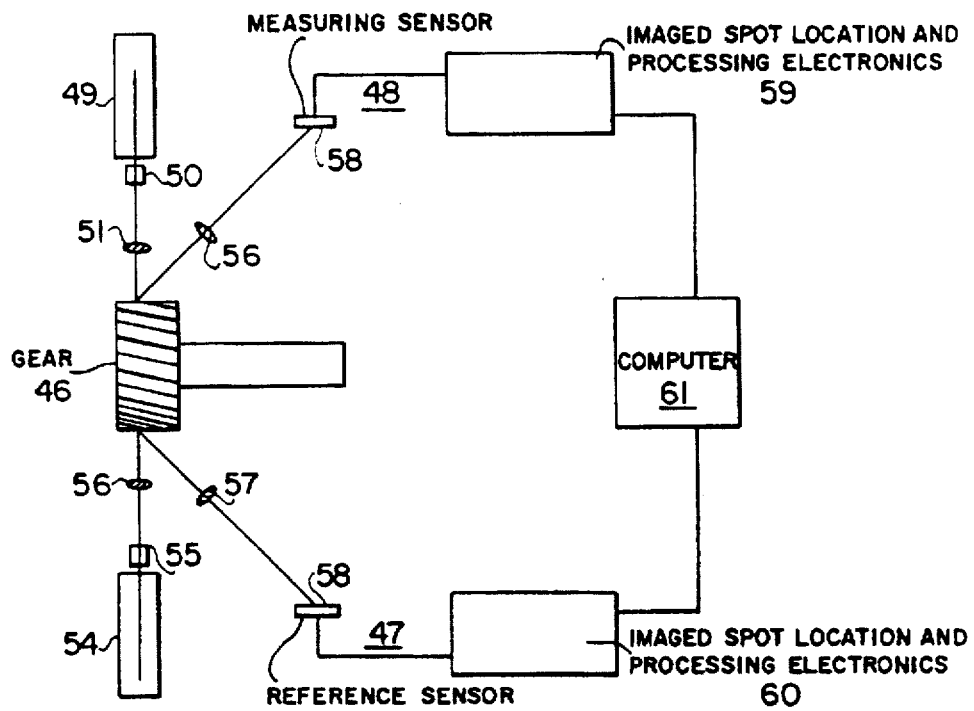
Figure 12:
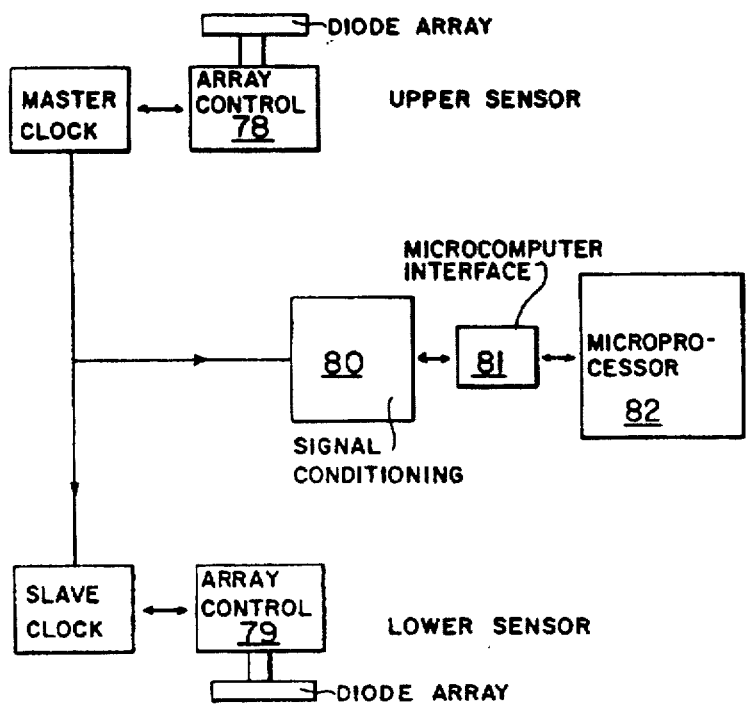
Figure 10:
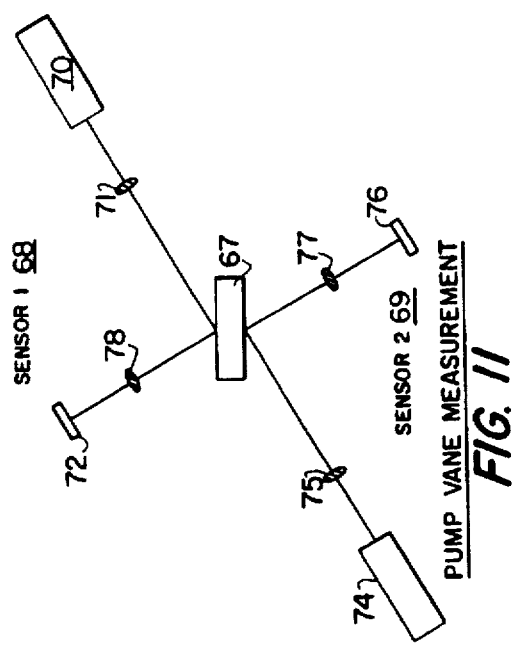
Figure 11:
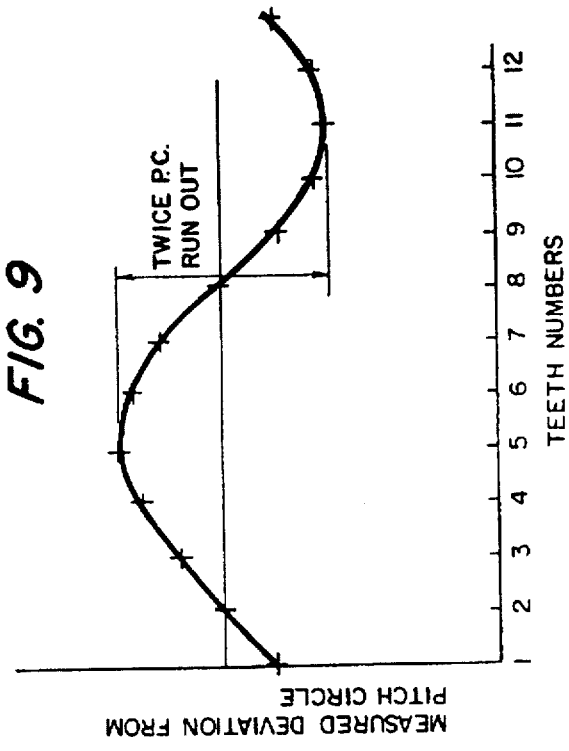
Figure 8:
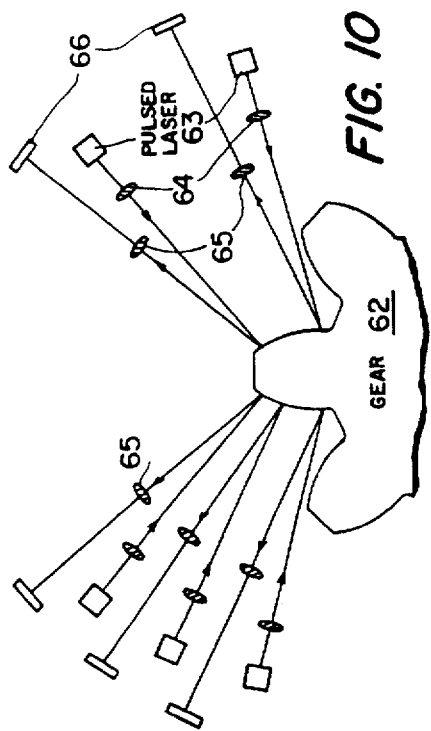
Figure 9:
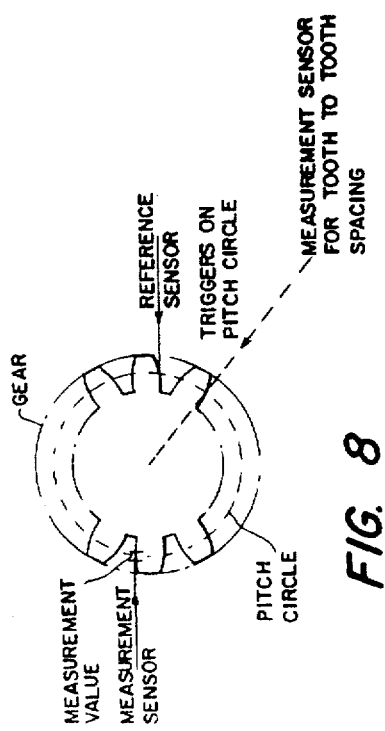
Figure 13:
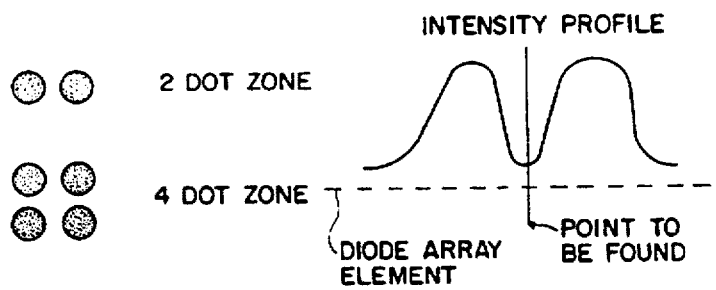
Figure 14:
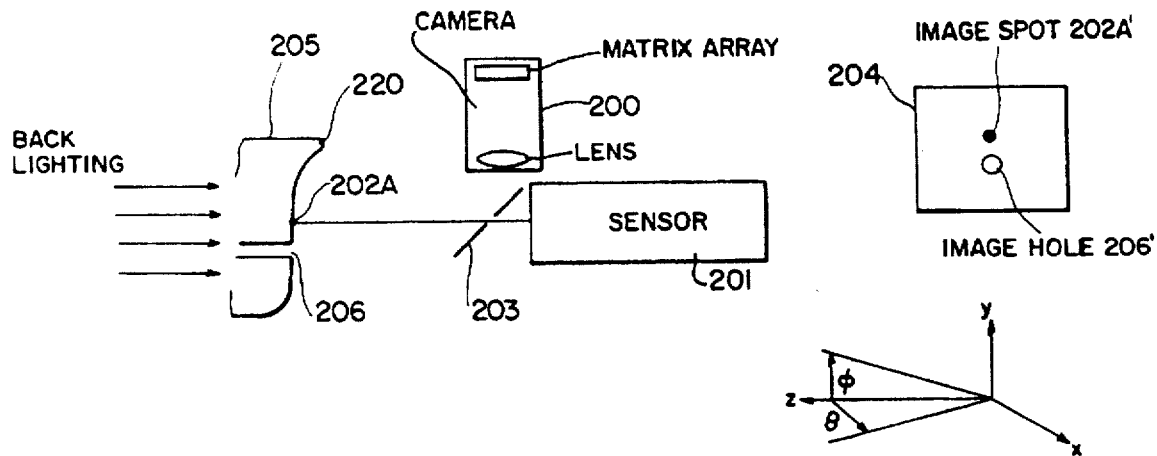
Figure 15:
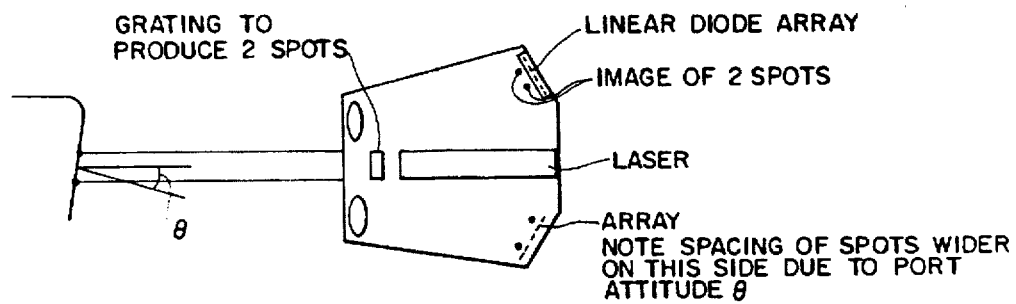
Figure 16:
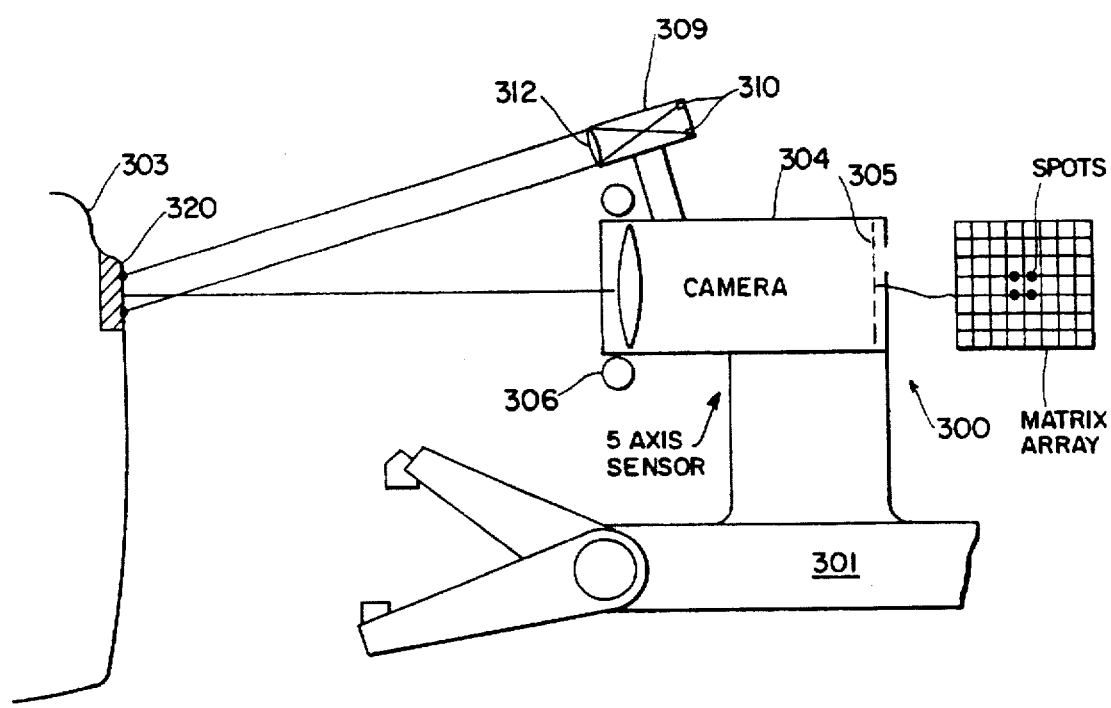
Figure 16A:
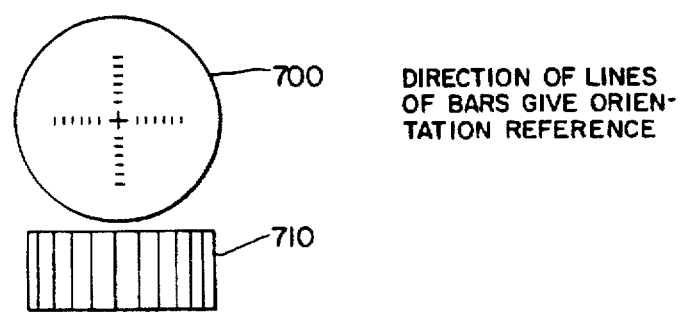
Figure 17:
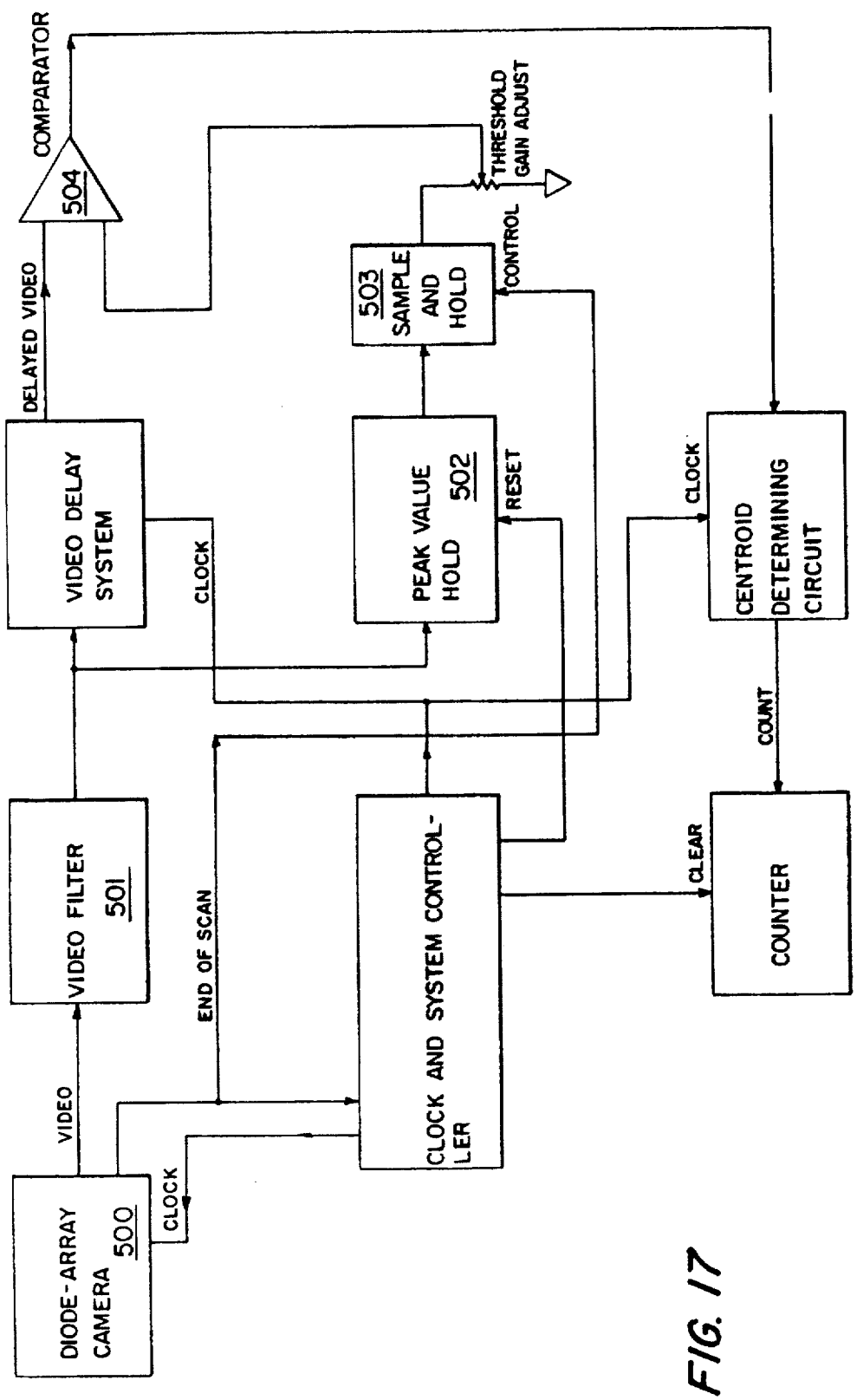
Figure 18:
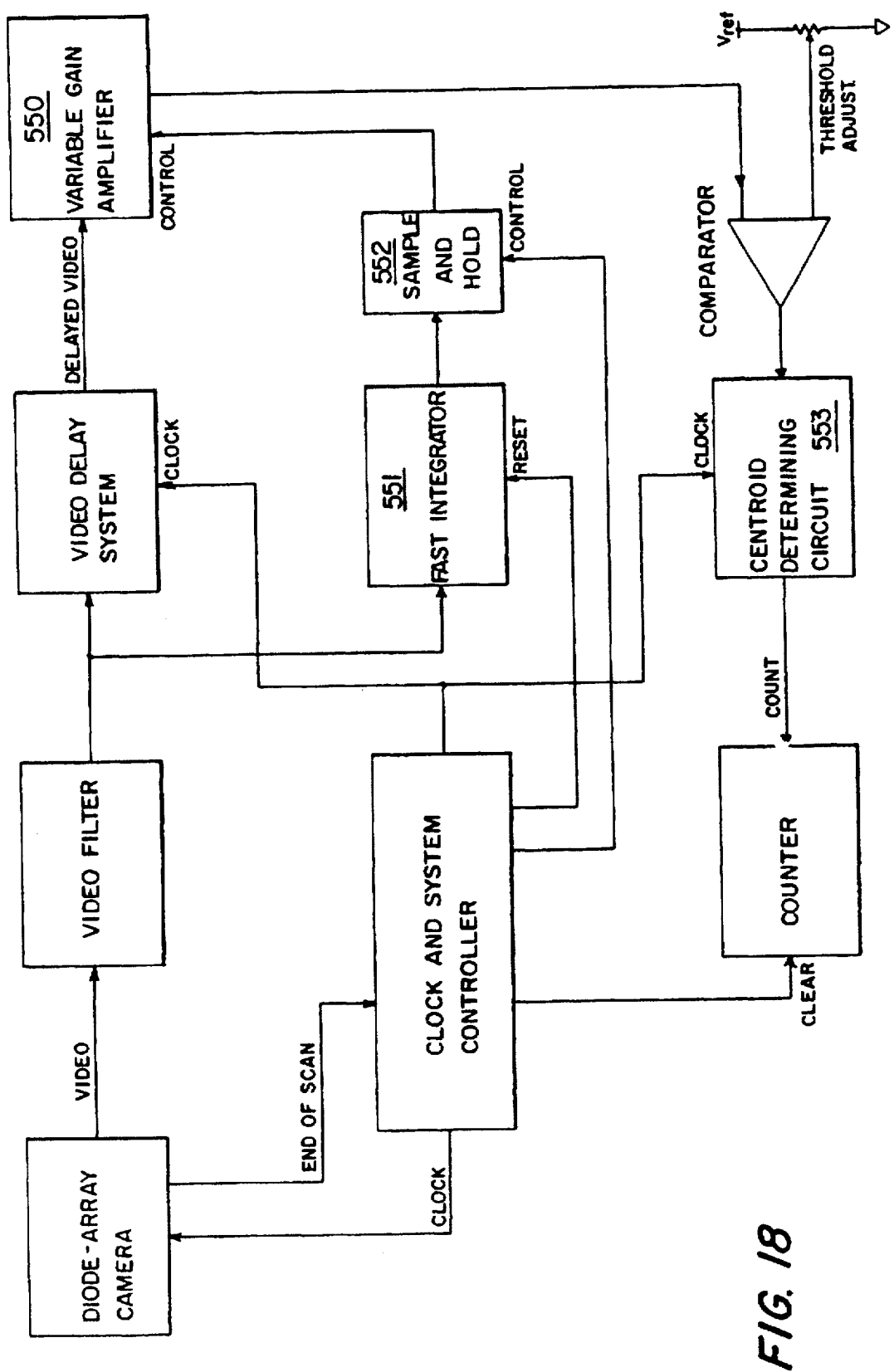

FIGS. 5 and 6 are graphical representations of a scan of a diode array illustrating a technique for finding the optical center of a spot of light which falls on the array;

FIG. 7 is a diagrammatic view of a further embodiment of the invention particularly adapted to the measurement of the pitch circle runout of gears;

FIG. 8 is a diagrammatic view of a portion of the embodiment of FIG. 7;

FIG. 9 is a graphical representation of data generated by the embodiment of FIG. 7;

FIG. 10 is a diagrammatic view of a portion of a further embodiment of the invention adapted to the measurement of gear involute or helix angle;

FIG. 11 is a diagrammatic view of a portion of a further embodiment of the invention adapted to the measurement of the thickness of a small flat pump vane;

FIG. 12 is a block diagram of an electronic system for performing the measuring function in the embodiment of FIG. 11;

FIG. 13 is a graphical representation of a system in accordance with the invention wherein a line image, as opposed to a spot image, is projected onto the object under examination;

FIGS. 14 and 15 are diagrammatic views of further embodiments of the invention adapted to sense yaw and pitch;

FIGS. 16 and 16A are diagrammatic views of a further embodiment of the invention having capability of five axis sensing; and FIGS. 17 and 18 are block diagrams of electronic systems particularly useful for sensing moving parts in accordance with the invention.

Figure 1:
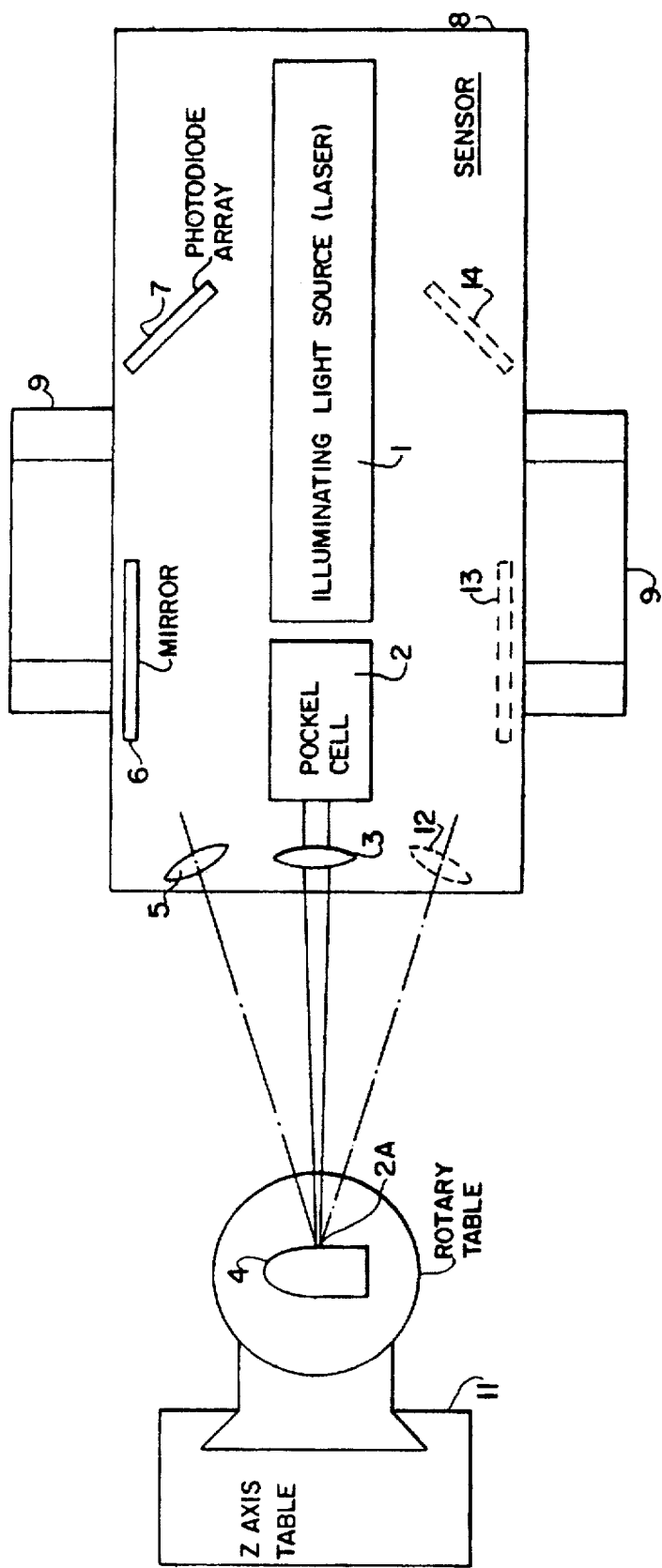
FIG. 1 is a diagrammatic view of an embodiment of the invention.

FIG. 1 illustrates apparatus useful for the contouring of three dimensional objects (for example, turbine blades and gears). This system can be operated in two distinct modes. In one of these modes, the theoretical part shape is stored in a computer which moves the sensor under its control through the theoretical shape of the part and any signal from sensor indicates a part deviation from nominal size. A second mode is useful in scanning part surfaces to digitize the surface shape. In this second mode the sensor itself is used as a null seeking device and any movement of the sensor necessary to keep the system nulled is recorded by the computer as the part shape.

One primary advantage of this type of system is that it is non-contacting. The optical means of measurement allows one to measure parts that are either too soft to be touched by mechanical probes, or too brittle or fragile. In addition, even though the sensor itself may have a very small measurement range in the order of several tenths of an inch, the overall system can have measurement ranges in the order of 6 to 10 inches because of the ability of high resolution precision tables to move the sensor over these large areas. Also, there are no contact points to wear, or get caught in holes, and the system can also check the presence of holes. Thus there is provided a very accurate, local sensor reference that does not touch the part and additionally a highly accurate frame of reference capable of containing a measurement volume of several cubic feet.

The system consists of three basic parts: a sensor, a moveable table system; and a control computer.

The sensor (8) consists of an illuminating light source (1), in this case a laser, whose power output is controlled by a pockels cell (2). The light energy after passing through the pockels cell is focused to a spot 2A on the surface of the object (4) being measured, via a focussing lens (3). The light scattered from the object is picked up by an imaging lens (5) at angle δ and imaged onto a linear photo diode array (7). The function of the mirror (6) is to reduce the overall package size. The linear photo diode array then is used to sense the position of the imaged light spot. For optimum accuracy δ should be in the range 30°–50°. Current systems operate at 45°.

The optical system is aligned so that the image light spot is at the center of the linear photo diode array (7) when the surface of the object is in its nominal position. As the object (4) is moved either towards or away from the sensor (8) the imaged light spot moves across the photo diode array (7). The movement of the object (4) and the movement of the imaged light spot in the linear photo diode array (7) are related by similar triangles centered about the imaging lens (5). This technique is referred to as optical triangulation.

It is sometimes desirable, depending on the shape of the object, to have a duplicate light receiving system on the opposite side of the illumination spot. This would then consist of an additional imaging lens (12), an additional mirror (13) and an additional photo diode array (14).

It is important to note that it is desirable for highest accuracy to keep the laser spot or light spot very small on the surface of the object. A spot in the order of two to five thousandths of an inch is most generally desirable.

This is desirable for two reasons. First, any surface reflectivity variations across the light spot will result in centroid determination errors at the array. It has been observed that keeping the spot small reduces these types of errors dramatically. Secondly, since the spot on the object surface is magnified by the lens on the array, a small spot on the surface is needed to keep a reasonably small spot on the array. The small spot also allows tight curves to be gaged accurately.

In the case where a laser is used as the illumination source, there is, of course, the problem of speckle in the resultant image due to the coherence of the illuminating light. The means used to avoid this problem are, first to use as large an aperture imaging lens as possible, and second to use a wide photo diode array. This wide array will tend to average in a transverse direction the speckle in the laser spot. To illustrate, system accuracy was notably improved when, at a magnification of 3:1, a 0.017" wide diode array was used instead of the 0.001" wide version previously employed.

A very important design consideration in the sensor is the amount of light that is reflected from the object surface. In the normal course of events, an object surface can vary from very dull to very bright and from very rough to very smooth. These variations do modify the amount of light that is reflected from the surface of the object and, therefore, the resultant light on the photo diode array. Since a certain minimum amount of light is necessary for detection of the spot, and since the presence of too much light causes uncertainty in the location of the center of the spot, it is necessary to control the amount of light falling on the array or correspondingly, to control the integration time of the array to allow more light gathering time. For this reason, a micro computer (19) is used to control both the voltage on the pockels cell which, therefore, controls the amount of light striking the surface of the object, and also to control the operating speed or integration time of the linear photo diode array. Under normal operating mode, it is desirable to keep the photo diode array running with as high a speed as possible in order to maximize the speed of operation. Therefore, the primary control mode is to vary the power arriving at the surface by sampling the array and, in a feedback loop, via the micro computer, to control the photo diode array speed. If such a point is reached where the pockels cell is allowing the maximum amount of light from the laser to pass through it, then it is necessary to slow down the speed of operation of the photo diode array in order to work with surfaces that are even duller than those with which it is possible to word by controlling only the laser power. In this case, the overall speed of the gage is reduced. However, it is still possible to make measurements from dull surfaces. It is possible via this technique to work with surfaces whose reflectivity varies by up to 5 orders of magnitude ($10^5 \times$).

Another important point in the design of the sensor is the magnification used in the system. It is desirable to have an optical magnification ranging between three times and five times in order to take the greatest advantage of the spot movement in relation to the diode array size. In addition, it is possible to tilt the photo diode array at an angle to the direction of normal light incidence. This serves two functions. It helps maintain the focus of the system over a large range of movement and, it also results in a higher effective magnification.

Figure 2:
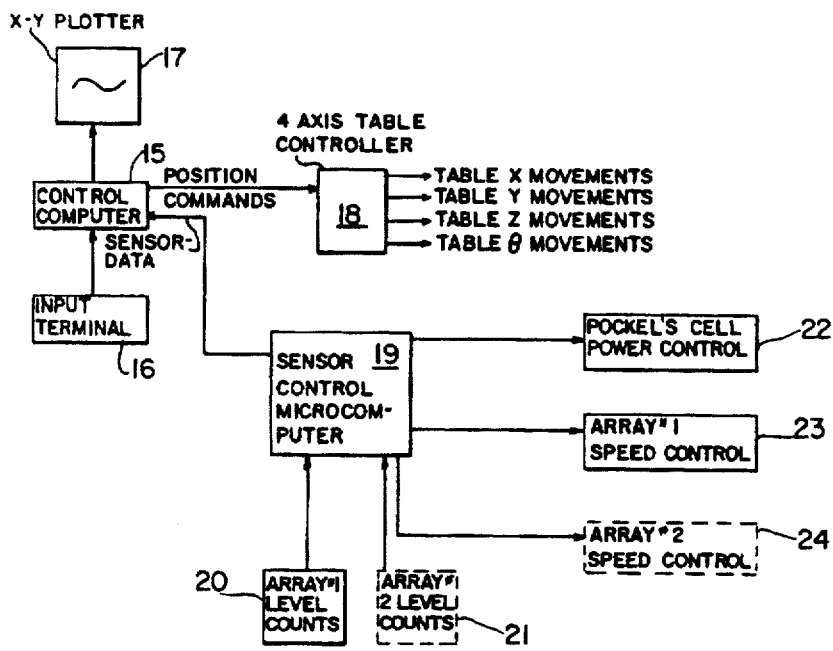
FIG. 2 is a block diagram of the basic elements of a system for moving the rotary tale of FIG. 1.

The moving table system allows the sensor head to have effectively larger range. For example, if the x-y tables (9) have a movement range of 6 inches each and resolution of 50 millionths of an inch, this, in conjunction with the sensor resolution being extremely high, allows one to have a very large high accuracy measuring volume. It is also possible for the z axis table (A1) to have a movement of 12 to 14 inches. This, coupled with the ability to rotate the part a full 360°, allows one to fully contour a part by moving in turn the x, the y, the z or the 0 axis. The control computer allows the design data for an object stored in its memory to be converted into movements of the sensor via the table system. The basic elements of the system are shown in FIG. 2 where there is shown a control computer (15), an input terminal (16), which is used to enter commands as well as additional data into computer, an x-y plotter (17), which is used to plot out contours or deviations from desired contour, a 4 axis table controller (18), which accepts commands from the control computer and thereby moves the sensor head to various locations in space and the sensor control micro computer (19), which controls the scanning speed of the arrays as well as the voltage applied to the pockels cell for light control. It also accepts information from the arrays or arrays (20) and (21), which will allow the micro computer to vary the array integration time.

Conversely, polar coordinate based systems can be used when the sensor is moved in r and 0, and possibly 0 as well. Polar arrangements are advantageous when contours of concave surfaces, for example, are desired. Such a system is also of interest if rapidly varying curvatures are encountered. Another advantage of a polar system is that the angular scan (0 or 0) can be mechanically very fast and smooth as it is provided by a high grade bearing motor and shaft encoder combination.

Figure 3:
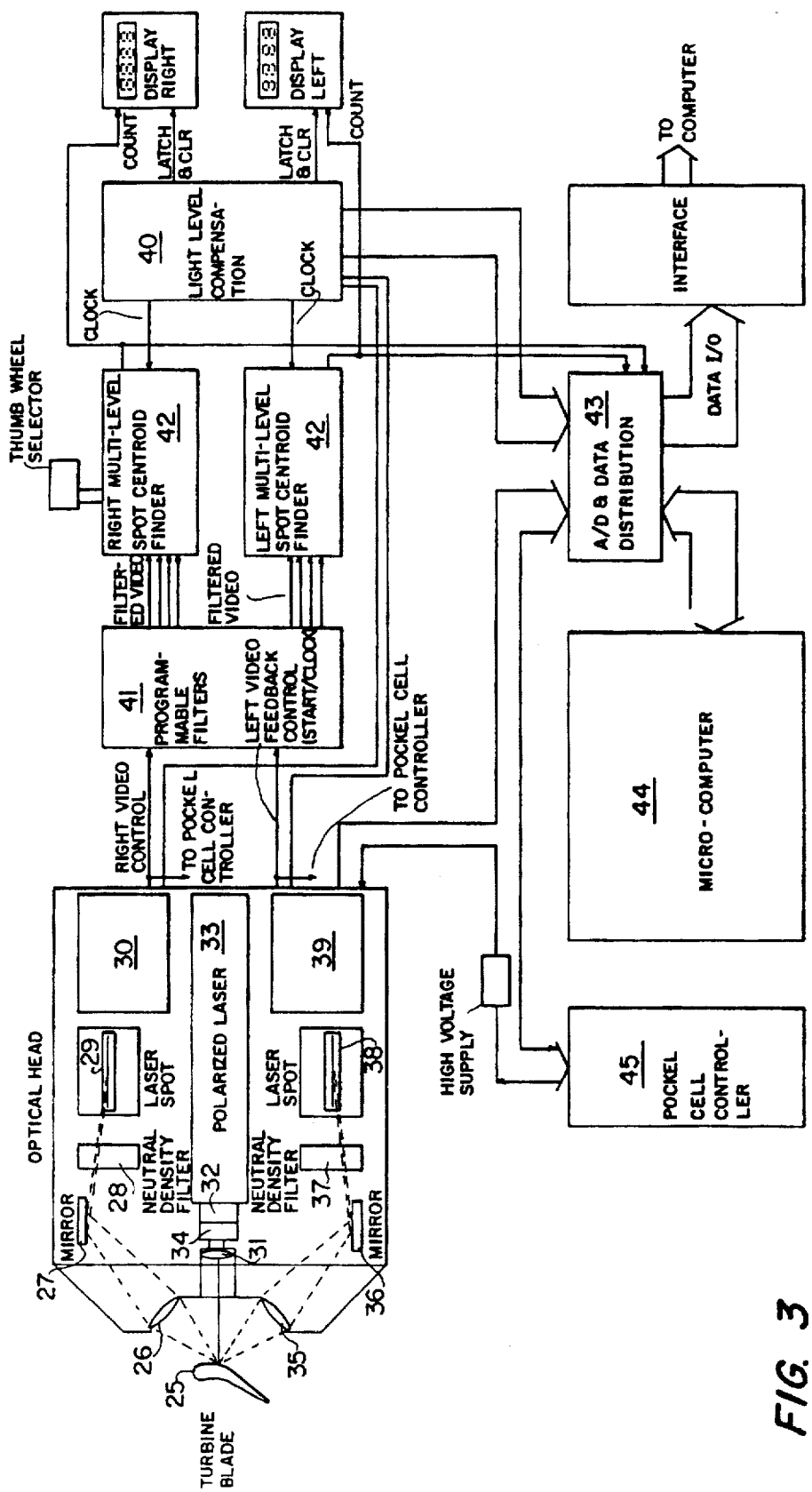
FIG. 3 is a diagrammatic view of a further embodiment of the invention.

A further embodiment of the invention is shown in FIG. 3. The electro-optical system within the optical head consists of the laser (33), pockets cells (32), analyzer (34), beam focussing lens (31), part being measured (25), imaging lenses (26)(35), linear diode arrays (29)(38), and diode array control cards (30)(39). Printed circuit diagrams PC 7807 (FIG. 3A) and PC 7808 (FIG. 3B) are incorporated by reference.

Figure 4:
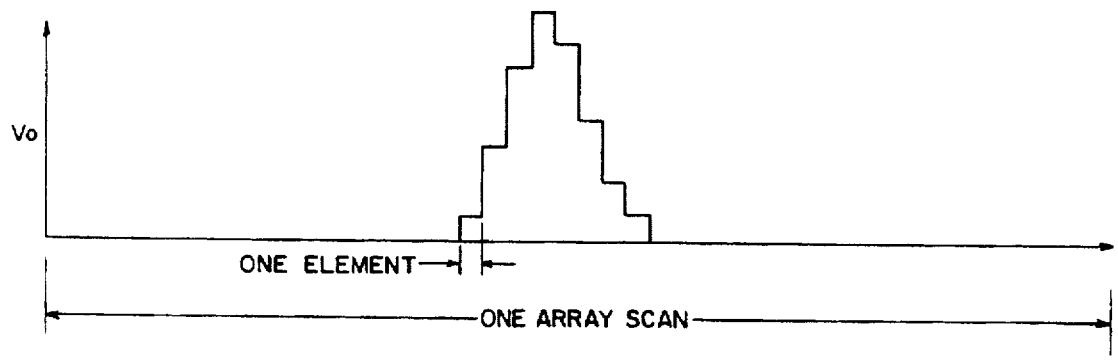
FIG. 4 is a graphical representation of a video output signal generated by the diode array of FIG. 3.

The video signal produced by the diode array is sampled and held between clock pulses to produce a boxcar type video output similar to FIG. 4. The array control boards work with external clock and start signals supplied by the light level compensation board P.C. 7808 (40). The video signals are fed to the programmable filters (low pass) (41) and the four video filter outputs per side are fed to their respective multi-level spot centroid finder (42) where one of the signals is selected. The video signal is then level detected, the resulting count pulse sequences are counted and displayed for visual indication, and also sent to the A/D and Data Distribution card PC 7903 (43) where they are counted in binary. The resulting binary number is then sent to the micro computer (44) where the data is scaled and linearized.

In operation, the external control computer signals the internal micro-computer to initiate a reading. The micro-computer in turn signals the pockels cell controller (45) to take a light power reading. On completion of this, the pockels cell is set by the controller to a certain illumination level. After this operation, the light level compensation circuit is signaled to initiate a sequence of diode array scans.

Once the left and optional right channel readings are obtained the data is sent to the micro-computer for processing, after which data is put on the computer bus.

The linear diode arrays are set to operate from an external clock and each scan is initiated by an external start command. The image of the laser spot formed on the diode array by lens (26) produces a voltage pulse on the video output of the diode array giving indication where the spot is located on the array. The shape of this video pulse follows the Gaussian power distribution of the laser; its magnitude depends on the intensity of the reflected light and the time delay between two subsequent scans. To accommodate the changes in intensity of the illuminating beam and a secondary system which is based on generating increasing time delays between subsequent scans.

When a new reading is initiated by the computer or an external control device, the primary light level compensation is activated. The pockels cell controller takes a voltage measurement, of the video pulse through a peak hold circuit and based on this measurement, it either reduces or increases the intensity of the illuminating beam. The pockels cell voltage, and therefore the light output, is held constant for the duration of the upcoming dimensional measurement.

The dimensional measurement is initiated by the micro-computer (44) after the pockels cell has settled down to a new intensity level. The linear diode arrays are operated at a constant clock rate put out by the light level compensation board. The same board (PC 7808) also generates the array start pulses.

The amplitude of the signal generated by the photo diode arrays is proportional to the light integration time for a given optical power level. The light integration time is the elapsed time between the start of two subsequent scans. Thus, controlling the integration time allows one to control the diode array output voltage: meanwhile the clock-rate can be kept constant. The constant clock-rate permits the use of constant bandwidth video filters (41) as the frequency content of the video signals remains unchanged from scan to scan. These filters are required to overcome the problem of multiple triggering on speckle effect induced high frequencies in the video signals. The system used in this gage generates start pulses to the diode arrays by a geometric sequence of T=t, T=2t, T=4t, T=8t etc. where t is the unit integration time. Thus the video output voltage varies as 1, 2, 4, 8 etc. with the increasing integration time on each subsequent scan. Each integrating time period consists of two parts, namely a wait period and a scan period. In this design, t equals the array scan time. Thus, during T=t, the wait period equals zero, in T=4t, T=8t, etc. the wait period is greater than the scan period.

The above binary sequence is generated on PC 7808 by the binary counter chain formed by D6, D5, D4, D11 and D10. The sequence number is generated by counter D9 and selected by multiplexer D12. At the end of each diode array scan D9 is incremented and a longer integration time gets selected by D12. When the wait period is over, a start pulse is generated, which initiates a diode array scan. The sequence is terminated, when either both video signals reach a fixed threshold level, or a scan cycle finished signal is generated by comparator D15, which limits the binary sequences to a number preset by a thumbwheel.

The optical triangulation method utilized in this design derives the dimensional information about the part by computing the position of the centroid of the light spots falling on the diode arrays. Rather than going through a complex computing method, a simple counting technique was devised to find the optical center or centroid of the spot as shown on FIG. 5.

Each diode array element is counted as 2 in zone A and when the video signal goes over the threshold in zone B, each element is counted as one. When video falls below the threshold at the end of B all counting stops at the end of the diode array scan. The counter, therefore, contains the position information. The count at this point is twice the number of array elements between the starting point and the center line of the spot, but by taking into account that the threshold is crossed twice, the accuracy of this number is twice as high as if A+B/2 was computed. Taking this argument further, a multiplicity of thresholds can be used to improve the position resolution to a greater degree. A system with 2 thresholds is shown in FIG. 6.

PC 7807 4 level Spot Centroid Finder has been extended to 4 threshold levels. Therefore, theoretically it will be a 4× improvement in accuracy.

Video filter selection is provided by analog switches A1, A2 and decoder A3. The output of buffer amplifier A4 is fed to the Inverting inputs of level detectors A7, A8, A9, A10. Buffer amplifiers in A6 provide fixed thresholds to the just mentioned level detectors. The threshold levels are produced by a resistor chain R3-10 and adjusted by potentiometer R12. Edge triggered flipflops D4, D5, D6, D11 detect the leading edge of the video pulse on their pin 11 inputs and the trailing edge on their pin 3 inputs. The outputs of the flip-flops are interrogated sequentially by data selector D2, selected by counter D1. The clock input to D1 is eight times faster than the diode array clock rate. The output of D1 is a count pulse sequence containing the positional information on the optical centerline of the laser spot.

To avoid jitter in the readings, the video signal level has to reach the threshold on A11 to validate the data. If this threshold is not reached during a scan, a new scan is initiated by PC 7808 after an integrating time twice as great as the previous one.

In cases where higher speed operation is necessary, it is possible to process the video signal using a delay line technique as follows. The video signal generated during a given scan is processed to give an average (or peak) power reading of the light spot intensity. During this same time period, the signal is passed through a delay line. The average (or peak) power reading is then used to set the threshold levels used to obtain the spot center locations as discussed above.

An example of the adaptation of the optical gaging technique to a specific problem is the measurement of the pitch circle runout of gears (46). Two optical triangulating systems and their electronics are used to perform the measurement. One is used to form a reference location and triggering unit and is referred to as the reference sensor (47). The other is used to make the measurement on the command of the reference sensor and this is referred to as the measurement sensor (48).

Both units are the same, consisting of a laser light source (49, 54) and a pockel cell (50, 55) to control the light output intensity. The light output is focussed to a small diameter spot by a focussing lens (51, 56) and an image of this light spot on the object is focussed by an imaging lens (52, 57) to form an imaged spot on the linear photo diode array (53, 58). The linear photo diode array is used to measure the position of the light imaged spot which is then related to the position of the surface of the gear with respect to the measurement unit.

The reference and measurement sensors (47, 48) are directed radially towards the centre of the gear (FIG. 8). The optical systems are aligned so that the measurement range or the sensors is centered on the pitch circle radius of the gear. For a gear with an even number of teeth the sensors are diametrically opposite each other and for an odd number of teeth the sensor has a rotational angular offset of half a gear tooth.

On the rotation of the gear (46) about its axis, the reference sensor measures the radial position of the gear tooth surface with respect to the pitch circle radius. When the required surface of the gear tooth is at the pitch circle radius as shown in FIG. 8, the reference sensor triggers the measuring sensor to take a measurement of the radial position of the surface of the gear teeth opposite the reference sensor. For a perfect gear this surface will also be at the pitch circle radius. However, if there is some pitch circle runout on the gear, which is formed by the geometric centre of the gear teeth being displaced from the rotational axis of the gear, the position of the surface being measured will effectively move away from the pitch circle radius in a cycle manner as shown in FIG. 9. The amount of radial displacement of the surface of the gear teeth as the gear is rotated through a complete revolution is equal to twice the displacement of the pitch circle centre with respect to the rotating axis of the gear.

Additional parameters of the gear can be derived by some modifications of this concept. Individual tooth to tooth spacing can be measured by observing adjacent teeth with the time sensors as shown in FIG. 8. The involute profile of the gear teeth can be measured with the addition of a high resolution angular encoder mounted to the gear rotation mechanism and facilities for traversing the sensor head in the radial direction. These modifications would convert the whole system with a two dimensional measurement device operating in Polar coordinates. Movement of the measurement sensor in a direction parallel to the axis of the gear (46) would enable the three dimensional form of the gear teeth to be measured to provide information on the helix angle of the gear and the lead deviation.

The gear involute or helix angle can also be measured at high speed by a further modification to the optical triangulating technique as shown in FIG. 10. In this case, an array of point measurements are made simultaneously on the gear involute or helix angle form by a bank of optical triangulating sensors rather than moving the gear or the triangulating sensor to produce the required number of measurements.

Each individual sensor consists of a light source (63), focussing lens (64), imaging lens (65), and linear photo diode array detector (66). To achieve a high speed of measurement, the light sources would be pulsed simultaneously to freeze the motion of the component in the correct position. In this case the light sources would be pulsed semi conductor lasers or similar devices. The information from the linear photo diode arrays is read by the system electronics and transferred to a microprocessor for the final shape calculations.

This technique is also applicable to the rapid measurement of discrete points and parameters using optical triangulation on other components such as complete gears, turbine blades and other mechanical systems.

Shown in FIG. 11 is another example of the use of optical triangulation to a specific measurement is a system that is designed to measure the thickness of a small flat pump vane (67) at a high part rate. This technique utilizes two optical triangulating sensors, operating in a differential mode to accommodate the errors in the position of the component as it slides down a track across the measurement zone.

The two triangulating sensors (68, 69) are identical and consist of a laser light source (70, 74) whose output is focussed down to a small diameter spot on the surface of the component by a focussing lens (71, 75). An image of this light spot is transferred to a linear photo diode array (72, 76) by an imaging lens (78, 77). The linear photo diode array is used to measure the geometric position of the imaged spot which is related to the position of the surface of the component with respect to the triangulating sensor.

Each of the sensors is placed on opposite sides of the thickness region of the component that is being measured. The component (67) is transported along a mechanical track across the measurement zone of the two triangulating sensors. The presence of the component in the measurement zone is detected by the sensors and, as the component moves across the zone, a number of measurements of the thickness are taken. The thickness is generated by measuring the position of the two surfaces with reference to their respective sensors and subtracting these values to form the thickness.

The electronic technique for performing the measurement function is outlined in block diagram form in FIG. 12. The video output of the linear photo diode array for each of the two sensor units is processed in the same manner. The electronic system consists of the control electronics for the diode arrays (78, 79) a signal conditioning system (80), a microcomputer interface (81) and a microcomputer (82). The light intensity of the laser (70) and scan speed of the linear photo diode array (72) are adjusted to make the response of the linear photo diode array approach saturation to produce well defined edges of the imaged spot on the video signal. The position of the edges of the image and position of the total image is measured in the signal conditioning unit (80) by a thresholding technique as described in the section on the electro-optical system for optical triangulation.

The positions of the images on the two linear photo diode arrays are transferred from the signal conditioning electronics (80) to the micro processor (82) via the microprocessor interface (81). Within the microprocessor this information is translated into thickness measurements. A series of thickness measurements of the component are stored and analyzed in the following manner. The most frequently occurring thickness value for the part is noted. The measurement values within a given band of this value are averaged to provide the final measurement. Information outside this band is rejected. This processing technique is used to find a time mean value and to accommodate the effects of randomly occurring surface finish and roughness variations.

Besides the variable integration time approach used to achieve operation in the above embodiments under widely varying light level, it is also possible to vary the clock rate of the scan. This is done by speeding up the scan rate when an excess of light is present and slowing it down when less light is reflected from the surface into the optical system.

This variable clock rate system is effective but unfortunately results in a varying frequency output of the gage which makes it difficult to achieve the use of video filters which is effective for decreasing the effects of speckle and other surface noise.

One advantage of the variable clock rate, however, is that the clock rate can be varied within an individual scan. This can have use when more than one image, for example, is on the surface as in the case of projecting two zones on the part. It also can have advantage when it is desired to equalize even the power coming back from even individual sections of any spot.

Also of interest is the use of delay lines, either analog or digital at the output of the diode arrays in order to store the previous diode array trace and so determine from the stored value what the sensitivity selection in terms of integration time or clock rate should be for the next scan.

It should also be noted that it is possible to use two axis rather than one axis photo diode arrays in this invention. For example, use of a square matrix photo diode array allows spot centers to be tracked even if they move off in another plane and it allows their true spot centroids in two planes to be calculated.

A two axis array is also of value when more than one spot in one axis is projected as is discussed below in the context of sensing attitude.

Circular arrays may also be used. Of particular value would be a radial diode array with all lines emanating from a center. Such an array is not typically available at present but it is thought that it will be in the future and use of such an array allows polar coordinate symmetry to be utilized.

Other Zones

In the foregoing there has been discussed the projection of a spot type zone onto the part (e.g. 2A in FIG. 1) and the corresponding readout of where the spot position is. Shown in FIG. 13, however, is a projection of a line onto the part which is surrounded by two light levels. In effect the zone either shaped like two dots with a dark zone in between or four dots with two lines in between, almost reticle fashion. The diode array unit described above, utilized in a manner similar to FIG. 1, can easily find the center of the dark zone between the two bright zones and from the metrological point of view, this is perhaps a better type of measurement than measuring the centroid of a single spot.

The question, of course, is how to provide the sharply defined line on the surface? One way is to simply image a line or cross hair on the part, which is achievable as long as the distance variation is not too great from the focal point. Naturally, as one gets farther away from the focal point of the projection system, the projected grid line would become fuzzier and correspondingly harder to accurately define. The line should be very fine in order to create the minimum possible analog definition required of its location, and this requires close focus.

A second possibility is to project the $TEM_{01}$ mode of the laser which is in fact comprised of just such a pair of spaced spots. In this case the projection system would be very similar to that shown in FIG. 1. The only difference is that the $TEM_{01}$ mode as a whole is broader but the line between is smaller than the corresponding $TEM_{oo}$ spot. It is noted that when a two axis grid is produced, the matrix diode array discussed above is utilized to sense its position in two axes. This can also give object surface attitude information (see FIG. 14).

Correspondingly, more numbers of lines such as 2, 3, 4 etc. can be utilized. If this is carried to an extreme, one looses the ability to tell the absolute value of where the center is. For this reason it is thought that in the system described here, one or two lines is most useful. If more lines are used they should be perhaps be of different thicknesses etc. so that one knows which is which.

Another embodiment of the invention is shown in FIG. 14. In this case, a two axis matrix diode array camera 200 is added to the FIG. 1 type sensor 201 to view the area immediately around that of the measuring point 202A, using beam splitter 203. In this case, several advantages are obtained. First, a video display 204 can be provided which allows the operator to see the zone in which the measurement is taking place.

Second, the immediate surroundings of the part can be measured in the x-y plane simply from the matrix diode array image and as such it may not be necessary to go to all of those points in succession electro-mechanically in order to perform a measurement of, for example, a hole diameter. This is shown in the example wherein an automotive dashboard 205 is being measured with the back lighting to illuminate holes such as hole 206. The contours around the hole and of the shape of the part are measured as in the FIG. 1 case where the hole measurement being taken from the matrix array which is linked to a computer to determine the diameter and out of round needed of the hole.

A third advantage in utilizing this bore sited camera is that one is able to sense ahead of the measuring point and to in essence, tell the unit where to go. In other words, if it is seen through the matrix array that an edge of a part such as edge 220 is being approached, this edge location can be noted in the program and the sensor unit told to move to another location. In other words, considerable time savings result.

A final embodiment of the invention describes the sensing of attitude using the invention and its further incorporation into control systems for robots and other automation.

In the embodiment of FIG. 14, a three-axis capability has been provided, one axis (__) with the triangulated measuring point, and the two axes (x,y) with the matrix diode array operating either in transmission or reflection from the part object. It is now desirable to add a further two axes of sensing to make a five axis sensor unit. The two axes in question are yaw and pitch or the angles 0 and 0 as seen from the sensor. 0 lies in the xy plane, 0 in the y-z plane.

There are two ways of adding this sensing. The first, as shown in FIG. 15, is simply to project two beams instead of one and view the image of bowel spots on the linear photo diode array (or diode arrays if two are utilized, one on each side as in FIG. 1). In this case, the spacing of the spots is proportional to the angular tilt of the surface whereas the position of the center of the two spots on the array is proportional to the distance of the surface from the sensor head. Sensing of the two spot separations gives the angle of the surface in the plane of measurement.

If two sensors, one on each side in the same plane are utilized as in FIG. 1, an interesting feature results in that when the part is perfectly normal to the sensor head, both of the units, one on each side, are at equal angles from the center beam and read identically. This can increase the accuracy obtainable from the angle measurement considerably and also gives a very clear definition of normality independent of other features.

Naturally, if attitude measurement in two planes, O and O is to be accomplished, sensing is required in the two axes x and y to the first. This situation is shown in FIG. 16 which shows a 5 axis sensor head embodiment of the invention, 300, mounted on a robot arm, 301, and sensing in 0, 0, x, y, and z. This sensor is completely capable of characterizing the total location of a part 303 near a robot for the purpose of either inspecting the part or of performing some manipulation on it automatically. The sensor head axes are all fed back to the robot control computer which then calculates the best approach and continually updates this calculation with continued sensor data until the robot end effector ("hand") has grabbed the part or done whatever operation is required.

It is clear that by combining sensors of FIGS. 14 and 15 such a 5 axis capability can be provided. However, a particularly compact and simple unit is shown in FIG. 16 wherein u matrix array camera 304 views the part in x and y, using for example flashed Xenon ring light source 306. A four spot projector 309 (see also FIG. 13) comprise a nest of four diode lasers 310 imaged onto the part by lens 312. A micro computer is utilized to interpret the data from array 305. First, the Xenon lamp is flashed, and the x and y location of a feature 320 of interest on part 303 is determined. Then the laser diodes are flashed, and the position of the 4 spot images is determined from the matrix array output. Analysis of the location of the center of the spot group gives range, while the individual spot spacings, $S_1$ and $S_2$ give 0 and 0.

Now described are particular circuit embodiments primarily useful on sensing moving parts, for example rotating gear teeth, etc. Changes in reflectivity of the part being measured can cause errors in finding the location of the spot centroid, due to erroneous level detection. The method described earlier, which is based on the external control of the light integration time combined with a pocket cell and its controller is suitable for measuring quasi-stationary objects only.

The only method can be used in optical triangulation systems, when either the object being measured is in motion, or the light source is of a pulsed type or a combination of the two. The problem, when the part being measured is in motion, is that the local reflectivity of the part is in constant change as the surface moves. Variations can be caused by angular changes or can be simply the local variations in color and reflectivity. The same applies when the light source used is of a pulsed type (such as pulsed lasers, flash tubes etc.), with the additional problem that the optical power of the returned beam only becomes known after the pulse has occurred.

To overcome the above stated problems, one can use a separate detector system to look at the reflected pulse and turn off the light source when a given accumulated energy level is reached. This is commonly done in thyristor flash guns used in photography for example.

An attractive approach is shown in FIG. 17. The signal coming from the diode array, 500, is filtered by video filter 501, and is fed to the video delay line, which is capable of storing one complete video stall. The signal going into the video delay line is peak height detected by peak hold, 502, and the detected voltage is transferred to the sample and hold circuit '503, at the end of the scan. Once the complete video scan is stored, the sample and hold amplifier sets the level detector threshold and the stored video is clocked out of the delay line and to the comparator, 504, which may operate with a multiplicity of thresholds. The threshold detected video in conjunction with the centroid finding circuit (described elsewhere in this disclosure) produces a series of count pulses to be summed in a counter.

An advantage of the above system is that the threshold for the comparator can be set after reading out the diode array. Therefore, the compensation for greatly varying video signals can be made automatic.

Another version is shown in FIG. 18. The significant difference is that this version has a variable gain amplifier, 550, whose gain is controlled in inverse proportion with the area under the curve, determined by fast integrator, 551, which represents the optical energy in the detected laser spot.

The operating sequence of this version is the same as that of FIG. 17, namely the filtered video signal is stored in the video delay system for the duration of one scan period, at the end of which the contents of the fast integrator is transferred and is then held in the sample and hold, circuit 552 for the duration of the next scan. Constant output voltage level is maintained by setting the gain of the variable gain amplifier in inverse proportion to the detected video levels. The output signal of the variable gain amplifier is compared to a fixed voltage or a multiplicity of voltages through a number of comparators to produce signals for the centroid determining circuit which in turn finds the position of the spot centroid.

It is of interest to conclude this application with a further discussion of five axis robot guidance (e.g. FIG. 16) plus a code system for simple orientation of parts.

The robot guidance head has been shown in FIG. 16. This is a combination of two different sensor technologies namely, triangulation to determine range and attitude in two planes (pitch and yaw), and two axis image scanning to obtain various features in the xy planes. The invention here provides a combination of these two technologies of particular suitability for the guidance of robots. If, for example, one considers the placement of such a five axis sensor (x, y, z, 0 and 0) on or near the end effector ("hand") after the last joint of a robot arm or other manipulator portion, this sensor then is fully capable of telling at least within its field of view exactly what the situation is relative to the sensor hand. This is then totally like the human in that it can tell the general characteristics needed to orient the hand to the part.

The simplest version is shown in FIG. 16 wherein the z axis range is obtained through triangulation, and wherein double range differential range measurements in each axis provide the attitude. The x and y vision is provided by conventional imaging systems, in this case a matrix photo diode array.

In the particular version shown the xy portion is provided using a lens together with the square matrix diode array system. Light is provided by a ring flash light source located around the periphery of the camera lens. Other light sources can be used, but this is the most convenient since it is flashed which keeps the camera from blooming and also because it is compact and provides relatively shadowless illumination. Actually shadows may be desired in some applications to provide contrast, but for generalized movement of the arm, it is considered that shadows would actually be a detriment since one would not know the angle of attack in every situation to the particular portion of the part in question.

Arrayed around this central portion are four CW, or preferably, pulsed collimated light sources. These project spots of light onto the part at a given distance and can be pulsed in sequence. The light sources may comprise light emitting diodes or diode lasers, but it is possible to form spots by breaking up a single beam into spots with a grating. Pulsing of light sources in sequence of importance because the operation of the system is to do just that in ripple fashion such that at any one time only the image of the particular spot in question exists. This way one can tell which image is on the diode array. It is not necessary in all cases but it is of considerable use.

An adjunct or alternative application of robot guidance is in the coding of the parts to be robotically manufactured. Normally, such codes are put on to serialize the parts for identification as to lot number etc. as well as serial. This, of course, can be done here as well with automatic bar code reading etc. (The matrix or linear arrays here disclosed prove excellent for this).

However, one of the more interesting aspects is that such a code can also be an orientation code, put on for the purposes of providing an easy reference for the two axis matrix diode array of the robot arm from which the orientation of the part may be determined. Naturally, this is of particular interest old those parts that have complex features that might make it difficult to otherwise orient.

The use of an orientation code, if possible, therefore essentially solves two of the vision requirements of the robot to a far more trivial state than would otherwise be the case. With such codes, no longer does the computer program in the robot have to identify which part is which, nor determine the possible complex orientation required to pick the part up or place it into a machine.

For example, again consider FIG. 16 in which case an orientation code sticker 700 is provided on the part together with a separate bar code part type representation, 710. While these two codes could be combined, it is thought here to be a better idea, at least at first, to separate them out.

The orientation code contains a set of intersecting axial lines which serve to determine the xy orientation. Also on this code is a sub-code which gives the third dimensional orientation, for example, in degrees of tilt.

Another way of giving third axis information is to look up in the computer using the part type bar code representing the orientation of the part when lying on a conveyer. A combination approach using the apparatus of FIG. 16 is to have the robot arm come down until the sensor is a fixed distance from the part (which can be obtained with a simple triangulating sensor on the arm). The unit is then programmed so that the code when viewed at the correct angle will measure the code bars to the spacing known to exist in normal incidence viewing.

In this case the pitch and yaw sensors would not necessarily be required here.

It is noted that the word robot also can be characterized by the word universal transfer device (UTD). However, the concepts here disclosed are apropos to control all sorts of material handling automation and not necessarily those of a universal nature.

What is claimed is:

1. Apparatus for accurate measurement of object location, attitude, or dimension comprising:
   light source means,
   means for directing light from said light source onto the surface of an object,
   means for detecting light reflected from said object,
   means for reading data relating to said reflected light from said detection means, and
   microcomputer means for controlling the light gathered by said detection means before readout thereof, and to determine from said data, the dimension, location or attitude of said object.

2. Apparatus according to claim 1 wherein said means for reading said data is said microcomputer.

3. Apparatus according to claim 1 further including means to temporarily store said data.

4. Apparatus according to claim 3 wherein said light source means is a laser.

5. Apparatus according to claim 1 wherein said light directing means includes a lens.

6. Apparatus according to claim 1 further including a lens for imaging light from said object onto said detection means.

7. Apparatus according to claim 6 further including means for determining position of said image on said detection means.

8. Apparatus according to claim 1 further including means to linearize the output of said detection means over a range of operation.

9. Apparatus according to claim 8, wherein said linearization means is said microcomputer.

10. Apparatus according to claim 1 wherein a display is additionally provided of said light on said surface.

11. Apparatus according to claim 1 wherein microcomputer means controls at least one light gathering variable from the group comprising: light power, duration of light illumination, and time of detector exposure to said light.

12. Apparatus according to claim 1 wherein the shape of said object is determined.

13. Apparatus according to claim 1 wherein said microcomputer uses data from two sensors determining the position of said object from different views.

14. Apparatus according to claim 13 wherein object thickness is determined.

15. Apparatus for accurate measurement of object location, attitude, or dimension comprising:
   diode laser means,
   means for directing light from said laser onto the surface of an object,
   means for imaging light reflected from said object,
   means for detecting light reflected from said object,
   means for reading data related to said reflected light from said detection means,
   means for controlling the light gathered by said detection means before readout thereof, and
   means for determining from said data, the dimension, location or attitude of said object.

16. Apparatus according to claim 15 including means for detecting the position of the image.

17. Apparatus according to claim 15 wherein means for directing is a lens.

18. Apparatus according to claim 15 wherein microprocessor means is provided for controlling the light gathered by said detection means.

19. Apparatus according to claim 15 wherein said laser operates using one or more laser diodes.

20. Apparatus according to claim 15 wherein a display is additionally provided of said laser light on said surface.

21. Apparatus according to claim 15 including means to linearize output of said detection means over a range of operation.

22. Apparatus for accurate measurement of object location, attitude, or dimension comprising:
   light source means,
   means including a lens for directing light from said light source means onto the surface of an object, means for imaging light reflected from said object, means for detecting the position of the image of said light on said surface of the object, means for reading data relating to said position from said detection means, means for determining from said image position, the dimension, location or attitude of said object with respect to said detection means, and means to linearize the output of said detection means over a range of operation.

23. Apparatus for accurate measurement of object location, attitude, or dimension comprising:

light source means for projecting light on to said object, means for imaging light reflected from said object, means for detecting the position of the image of said light on said surface of the object, means for controlling the light gathered by said detection means, means for determining from said image position, the dimension, location or attitude of said object with respect to said detection means, and means to linearize the output of said detection means over a range of operation.

24. Apparatus for accurate measurement of object location, attitude, or dimension comprising:

LED light source means, means including a lens for directing light from said light source onto the surface of an object, means for imaging light reflected from said object, means for detecting the position of the image of said light on said surface of the object, means for determining from said image position, the dimension, location or attitude of said object with respect to said detection means, and means to linearize the output of said detection means over a range of operation.

25. Apparatus according to claim 24 including means for controlling the light gathered by said detector means.

26. Apparatus for accurate measurement of object location, attitude, or dimension comprising:

LED light source means, means including a lens for directing light from said light source onto a small region on the surface of a object, means for imaging light reflected from said object, means for detecting the position of the image said light reflected on said object surface, means for reading the data from said detection means, means for determining from said image position, the dimension, location or attitude of said object with respect to said detection means, and means for controlling the light gathered by said detection means.

27. Apparatus according to claim 26 including means to linearize the output of said detection means over a range of operation.

28. Apparatus for accurate measurement of object location, attitude, or dimension comprising:

diode laser light source means, means including a lens for directing light from said laser onto the surface of a object, means for imaging light reflected from said object, means for detecting the image of said light on said object surface, means for reading data from said detection means relating to said image, means for controlling the light gathered by said detection means, and means for determining from said data, the dimension, location or attitude of said object with respect to said detection means.

29. Apparatus according to claim 28 including means to linearize the output of said detection means over a range of operation.

30. Apparatus according to claim 1, 15, 22, 23, 24, 26 or 28, wherein said detection means is a photodetector array.

31. Apparatus according to claim 30, wherein light gathering of said array is controlled by varying array clock speed, integration time, or scan rate.

32. Apparatus according to claim 30 wherein the output of said array is filtered.

33. Apparatus according to claim 30 wherein said data from said array is determined to a resolution finer than the pixel spacing of said array.

34. A method for accurate measurement of object location, attitude, or dimension comprising the steps of:

providing a light source means, directing light from said light source onto the surface of said object, detecting light from said object with a detection means, reading data from said detection means, and using a microcomputer means, controlling light gathered by said detection means, and determining from said data, the dimension, location or attitude of said object.

35. A method according to claim 34 wherein said light is directed along an axis, and further including the step of moving said axis relative to an object to be measured to determine range to multiple object points.

36. A method according to claim 34 further including the step of determining a desired detection means characteristic or light source characteristic, and varying at least one of said characteristics to effect subsequent readings of said data.

37. A method according to claim 36 wherein said at least one of said characteristics is chosen to optimize said measurement.

38. A method for accurate measurement of object location, attitude, or dimension comprising:

providing light source means, directing light from said light source means onto the surface of an object using a means including a lens, imaging the light reflected from said object, detecting the position of the image of said light on said surface of the object with a detection means, reading data relating to said position from said detection means, determining from said image position, the dimension, location or attitude of said object with respect to said detection means, and linearizing the output of said detection means over a range of operation.

39. A method for accurate measurement of object location, attitude, or dimension comprising:

projecting light from a light source means on to said object, imaging light reflected from said object, detecting the position of the image of said light on said surface of the object with a detection means, controlling the light gathered by said detection means, determining from said image position, the dimension, location or attitude of said object with respect to said detection means, and linearizing the output of said detection means over a range of operation.

40. A method for accurate measurement of object location, attitude, or dimension comprising:

providing a LED light source means, directing light from said light source onto the surface of an object using a means including a lens, imaging light reflected from said object, detecting the position of the image of said light on said surface of the object with a detection means, determining from said image position, the dimension, location or attitude of said object with respect to said detection means, and linearizing the output of said detection means over a range of operation.

* * * * *